US012695412B2

(12) United States Patent
Couñago Lorenzo et al.

(10) Patent No.: US 12,695,412 B2
(45) Date of Patent: Jul. 28, 2026

(54) FLOATING DEVICE FOR THE INSTALLATION OF OFFSHORE PHOTOVOLTAIC PANELS AND INSTALLATION METHOD

(71) Applicant: BLUENEWABLES SL, Guía de Isora (ES)

(72) Inventors: Bernadino Couñago Lorenzo, Madrid (ES); Óscar Sainz Ávila, Rotterdam (NL); Ismael Fernández Gil, Los Cristianos (ES); Sergio Hernández Blanco, Madrid (ES); Cecilio Barahona Oviedo, Madrid (ES); Fernando Vigara Martín, Madrid (ES); Clara García Sainz, Madrid (ES)

(73) Assignee: BLUENEWABLES SL, Guía de Isora (ES)

( * ) Notice: Subject to any disclaimer, the term of this patent is extended or adjusted under 35 U.S.C. 154(b) by 211 days.

(21) Appl. No.: 18/702,403

(22) PCT Filed: Oct. 19, 2021

(86) PCT No.: PCT/ES2021/070759
§ 371 (c)(1),
(2) Date: Apr. 18, 2024

(87) PCT Pub. No.: WO2023/067205
PCT Pub. Date: Apr. 27, 2023

(65) Prior Publication Data
US 2025/0260360 A1     Aug. 14, 2025

(51) Int. Cl.
*H02S 20/30*        (2014.01)
*B63B 1/10*         (2006.01)
(Continued)

(52) U.S. Cl.
CPC .............. *H02S 20/30* (2014.12); *B63B 1/107* (2013.01); *B63B 21/50* (2013.01); *B63B 35/44* (2013.01); *B63B 2035/4453* (2013.01)

(58) Field of Classification Search
CPC .... B63B 2035/4426; B63B 2035/4433; B63B 2035/4453
See application file for complete search history.

(56) References Cited

U.S. PATENT DOCUMENTS

| | | | | |
|---|---|---|---|---|
| 2012/0090667 A1* | 4/2012 | Cap | ......................... | F24S 20/70 |
| | | | | 136/251 |
| 2012/0279557 A1* | 11/2012 | Alwitt | ..................... | F24S 20/70 |
| | | | | 136/251 |

(Continued)

FOREIGN PATENT DOCUMENTS

| | | |
|---|---|---|
| CN | 211893593 U | 11/2020 |
| CN | 112498595 A | 3/2021 |

(Continued)

OTHER PUBLICATIONS

English machine translation of Atsushi (JP-2019217801-A) provided by the EPO website, All Pages, 2026. (Year: 2026).*

(Continued)

*Primary Examiner* — Daniel P Malley, Jr.
(74) *Attorney, Agent, or Firm* — Nathan & Associates Patent Agents Ltd.; Menachem Nathan

(57) ABSTRACT

The present invention relates to a floating device comprising a plurality of main floating bodies (1) configured to displace at least 80 cubic metres of water in total, a plurality of floating supports (2) configured to join the plurality of main floating bodies (1) together, a plurality of poles (3), each pole (3) having a first end that is joined to a main floating body (1) and a second end opposite to the first end, a support cover (4) joined to the second ends of the poles (3), wherein the support cover has a surface of at least 100 square metres, (Continued)

at least one anchoring element (5) and a mooring structure configured to join the main floating bodies (1) and/or the plurality of floating supports (2) with the anchoring element (5).

15 Claims, 3 Drawing Sheets

(51) Int. Cl.
  B63B 21/50          (2006.01)
  B63B 35/44          (2006.01)

(56)                References Cited

U.S. PATENT DOCUMENTS

| | | | | |
|---|---|---|---|---|
| 2016/0156304 | A1* | 6/2016 | Smadja | B63B 35/44 |
| | | | | 136/251 |
| 2019/0134822 | A1* | 5/2019 | Clemenzi | H02S 20/32 |
| 2021/0214056 | A1 | 7/2021 | Harrison et al. | |

| | | | | |
|---|---|---|---|---|
| 2023/0361714 | A1* | 11/2023 | Kim | F24S 25/12 |
| 2024/0186939 | A1* | 6/2024 | Zhang | B63B 35/44 |
| 2025/0091696 | A1* | 3/2025 | Boon | H02S 20/30 |

FOREIGN PATENT DOCUMENTS

| | | | | |
|---|---|---|---|---|
| JP | S61-98804 | A | | 5/1986 |
| JP | 2015-535772 | A | | 12/2015 |
| JP | 2019217801 | A | * | 12/2019 |
| JP | 2019-518402 | A | | 7/2023 |
| KR | 20160017555 | A | | 2/2016 |
| KR | 20190140154 | A | | 12/2019 |
| KR | 102085864 | B1 | | 3/2020 |
| KR | 102105173 | B1 | | 4/2020 |
| WO | 2014136107 | A1 | | 9/2014 |
| WO | 2020198618 | A1 | | 10/2020 |

OTHER PUBLICATIONS

Office Action in related Japan Application 2024539948, dated Aug. 5, 2025.

* cited by examiner 14    16    15

FLOATING DEVICE FOR THE INSTALLATION OF OFFSHORE PHOTOVOLTAIC PANELS AND INSTALLATION METHOD

FIELD OF THE INVENTION

The present invention belongs to the field of renewable energies installed in the water. More specifically, the invention relates to a floating device for the installation of offshore photovoltaic panels, as well as to the associated installation method and uses.

BACKGROUND OF THE INVENTION

Converting solar energy into electricity is an increasingly more cost-effective and efficient process. However, such large-scale conversion involves the occupation of large areas of land, which could be useful for agricultural purposes, for example. As a solution to this problem, floating photovoltaic power plants have been developed in recent years.

Floating photovoltaic power plants produce electricity from solar energy by means of photovoltaic systems floating on a surface of water. These systems are equipped with the same photovoltaic panels used for common land-based systems, but using specific technologies to ensure their stability and buoyancy on both inland and protected waters (reservoirs, basins, artificial lakes, agricultural irrigation ponds, sewage treatment plant sedimentation tanks, etc.) and oceanic waters (seas and oceans).

The floating photovoltaic systems offer a set of advantages compared with land-based photovoltaic systems:

- occupy an otherwise useless area, e.g., the open sea, port and marina easements, lakes or water dammed for electricity production by hydroelectric power plants;
- minimal soil consumption because, as they float on water, they do not consume useful soil (except for those parts used for connection to the general power grid);
- higher efficiency, due to their arrangement on surfaces with high solar exposure and less susceptibility to shading, and to the cooling effect of evaporation of the surrounding water, which counteracts the heating of the panels by the incidence of the sun's rays;
- reduced maintenance, as less frequent cleaning of the solar panels is required due to the reduced amount of dust stirred up and moved by the wind, and less trimming of vegetation that normally grows underneath the panels in land-based systems;
- greater sustainability by using a higher percentage of recyclable materials, mainly steel and aluminium; and,
- minimal environmental impact, as no ground levelling work is required prior to installation (the panels are transported to the installation point, assembled on the shore, and then introduced into the water).

In this context, floating photovoltaic plants at sea are still at an early stage compared to those installed on fresh water, due to the additional challenges that open sea conditions pose to their design. The large variations in height and support surface that solar panels experience due to the action of the wind, waves and/or sea currents, as well as the stresses generated in the structures that support these panels, make the capacity for mooring, anchoring and resistance to dynamic loads even more critical factors in the design of these floating systems.

Some documents disclose Tension Leg Platforms (TLPs) which are used for supporting solar panels in off-shore conditions.

Document CN 211893593 U discloses a semi-submergible device for supporting solar panels. This device comprises a submerged lower plate attached to an upper plate where the solar panels are attached to. The lower plate is anchored by tendons.

Document KR 20160017555 A discloses a semi-submergible device for supporting solar panels. In this case, the plate where the solar panels are attached to is supported by crossed spars which are connected to intermediate elements. The intermediate elements are attached to submerged tanks.

Document KR 102105173 B discloses a similar device but further comprising a compensating mechanism with pulleys to modify the depth of the device under the water.

The present invention proposes a solution to the aforementioned needs by means of a novel floating device having an improved hydrodynamic behaviour compared to known devices.

BRIEF DESCRIPTION OF THE INVENTION

In light of the problems in the prior art set forth in the preceding section, the object of the present invention relates primarily, though without limitation, to a floating device for the installation of offshore photovoltaic panels, as well as to the associated installation method and uses.

Unless otherwise defined, all terms (both scientific and technical) used in this document are to be interpreted as one skilled in the art would interpret them. It is therefore understood that terms of common usage should be interpreted as one skilled in the art would interpret them, and not in an idealised or strictly formal way.

Throughout the text, the word "comprises" must not be understand in an excluding manner, but rather must be understood in the sense that it allows for the possibility that what is defined may include additional elements or steps.

In a first inventive aspect, the invention relates to a floating device for the installation of offshore photovoltaic panels, said device being characterized in that comprises:

- a plurality of main floating bodies, arranged such that they define a floating plane, the main floating bodies being configured to displace at least 80 cubic metres of water in total, and the most distant floating bodies being spaced from one another by at least a distance of 10 metres;
- a plurality of floating supports configured to join the plurality of main floating bodies together;
- a plurality of poles arranged along each of the main floating bodies, each pole having a first end that is joined to a main floating body and a second end opposite to the first end, wherein each of the poles measures at least 5 metres;
- a support cover joined to the second ends of the poles, wherein the support cover has a surface of at least 100 square metres;
- at least one anchoring element; and
- a mooring structure configured to join the main floating bodies and/or the plurality of floating supports with the anchoring element.

The invention thereby provides a device capable of withstanding a large number of photovoltaic panels and keeping them stable at a considerable height above sea level, and the height of the poles can be defined as being greater than the significant wave height. A large number of photovoltaic panels can thereby be installed offshore in a safe manner.

In a preferred embodiment of the invention, the floating device further comprises a ship berthing element, comprising at least two impact structures suitable for receiving the impact of a vessel upon berthing; and an access stairway located on a plane other than the plane of the impact structures.

This ship berthing element allows inspections and reparations to be carried out in a simple manner. Given the magnitude of the floating device, which comprises a large number of supports for photovoltaic panels, it is advantageous to provide a manner in which a suitable vessel may approach without any danger for the floating device.

In a preferred embodiment of the invention, the floating supports are contained in the floating plane defined by the main floating bodies and the joining points between each floating support and the main floating body are arranged equidistantly, such that each floating support is joined orthogonally or diagonally to said floating bodies. This configuration provides the device with the rigidity needed to withstand the movements of the water, that is, both horizontal movements due to the waves and vertical movements due to variations of the water level.

In another preferred embodiment of the invention, some of the poles are arranged on the main floating bodies perpendicular to the floating plane. Other poles are arranged forming an angle comprised between 5° and 60° with respect to the floating plane. Optionally, at least one of the poles perpendicular to the floating plane and at least one of the poles forming an angle comprised between 5° and 60° with respect to the floating plane share a point of origin in the floating plane on the floating body. Said configuration provides a larger support surface and, therefore, greater stability to the support cover installed on said poles.

In another preferred embodiment of the invention, the main floating bodies, the floating supports, the poles, and the support cover form a base joined in an integral manner, and this configuration improves the hydrodynamic behaviour of the device as it is more robust against the action of the wind, the waves, and/or sea currents on the device.

In another preferred embodiment of the invention, the floating device of the invention further comprises at least ten tilt-adjustable structures, all of them being joined to the support cover, and each of them being configured to receive a solar panel and to regulate the orientation thereof with respect to the support cover. Loads acting on the device due to the action of the wind, waves, and/or sea currents are thereby withstood by the main floating bodies, the floating supports, the poles, and the support cover, but not by the adjustable structures. The adjustable structures allow suitable orientation of the solar panels with respect to the sun.

In another preferred embodiment of the invention, the floating device further comprises a current inverter or transformer element, suitable for receiving energy and conveying it out of the floating device.

Due to the large number of photovoltaic panels that can be installed in the floating device of the present invention, it is appropriate to provide an orderly output of all the energy generated by same. By means of an inverter or transformer element located in each floating element, a suitable output for all the energy generated is allowed to be provided.

In another preferred embodiment of the invention, the main floating bodies comprise several leak-tight compartments isolated from one another. A device that is more stable and resistant in the event of offshore adverse conditions is thereby achieved, because if one of the compartments is damaged and water enters said compartment, the remaining compartments are still leak-tight and, therefore, provide the device with the buoyancy needed to continue in operation.

In another preferred embodiment of the invention, the mooring structure comprises a grid of synthetic fibre ropes or chains, in which each vertex of said grid is joined to a main floating body and/or to a floating support by means of a secondary mooring element, such that the grid of chains or ropes is located in a plane other than the floating plane, wherein the joining of the secondary mooring elements with the main floating bodies and/or the plurality of floating supports comprise(s) galvanized, stainless steel, or swivel shackles. Preferably, at least two of the vertexes of the grid are joined to floating buoys so as to achieve an optimal distribution of loads along the mesh, increasing stability and resistance and optimising the use of the floating and anchoring elements.

Due to the large size of each device, it is advantageous to have a suitable floating structure, such as the one defined in this case, for example, with a grid of chains or ropes located in a plane lower than the floating plane. That structure, which is in charge of offsetting the different loads when there are several devices connected to one another, will be the one that will be connected to floating buoys.

In another preferred embodiment of the invention, the joining of the main mooring element with the main floating bodies and/or the plurality of floating supports, the joining of the main mooring element with the anchoring element, and/or the joining of the secondary mooring elements with the main floating bodies and/or the plurality of floating supports comprise(s) galvanized, stainless steel, or swivel shackles.

In another preferred embodiment of the invention, the anchoring element comprises an anchor or a dead weight, such as a concrete block, for example.

In another preferred embodiment of the invention, the main floating bodies comprise at least one anchoring element suitable for receiving the main mooring element and/or for coupling a tow.

A second object of the invention relates to a floating solar power plant, comprising:

a plurality of floating devices according to any of the embodiments of the invention described above;

a plurality of photovoltaic panels coupled to the support cover of each of the floating devices, each photovoltaic panel comprising a current output; and transverse joining elements configured to join at least two floating devices to one another.

Each floating device comprises at least one current output and the solar power plant comprises a general current output cable which receives the current outputs from each floating device, wherein said general current output cable comprises a floating element, thereby assuring that said cables are not tensed due to their own weight, thus preventing them from being affected by the loads exerted by the waves on the floating devices.

In particular embodiments, the floating solar power plant further comprises a global inverter or transformer element having an input connected to the current outputs of each floating device and having an output connected to the general current output cable.

A third object of the invention relates to an installation method for installing a plurality of photovoltaic panels, which comprises performing the following steps in any technically possible order:

considering a significant wave height;

providing one or more floating devices according to any of the embodiments of the invention described above, wherein the distance between the floating plane and the support cover is at least equal to the significant wave height;

providing a plurality of photovoltaic panels;

anchoring the main floating bodies or the floating supports of the floating device(s) at an installation point located in the water by means of the anchoring elements; and arranging the plurality of photovoltaic panels on the support cover (4) of the floating device(s).

Note, however, that the device and the solar power plant of the invention are specially designed for the installation of photovoltaic panels in seas, oceans, and ports. For that reason, a significant wave height is considered so as to be able to place the support cover at a sufficient height so that it is not affected by the force of the waves. However, the power plant according to the invention is also suitable for use in inland waters, such as reservoirs, lakes, irrigation canals, or ponds.

DESCRIPTION OF THE FIGURES

To complete the description and to make it easier to better understand the invention, a set of figures has been added to the description. These figures are part of the description and illustrate a particular example of the invention, which must not be interpreted as being limiting of the scope but rather as a mere example of how the invention can be carried out. This set of figures comprises the following.

REFERENCE NUMBERS USED IN THE FIGURES

In order to help to better understand the technical features of the invention, the mentioned figures include a series of reference numbers in which the following has been depicted in an illustrative and non-limiting manner:

| | |
|---|---|
| (1) | Main floating body |
| (2) | Floating support |
| (3) | Pole |
| (4) | Support cover |
| (5) | Anchoring element |
| (6) | Main mooring element |
| (7) | Tilt-adjustable structure |
| (8) | Secondary mooring element |
| (9) | Floating buoy |
| (10) | Transverse joining element |
| (11) | Transformer |
| (12) | Vessel receiving element |
| (13) | Stairway |
| (14) | Current output |
| (15) | General output cable |
| (16) | Floating element |

DETAILED DESCRIPTION OF THE INVENTION

Figure 1:
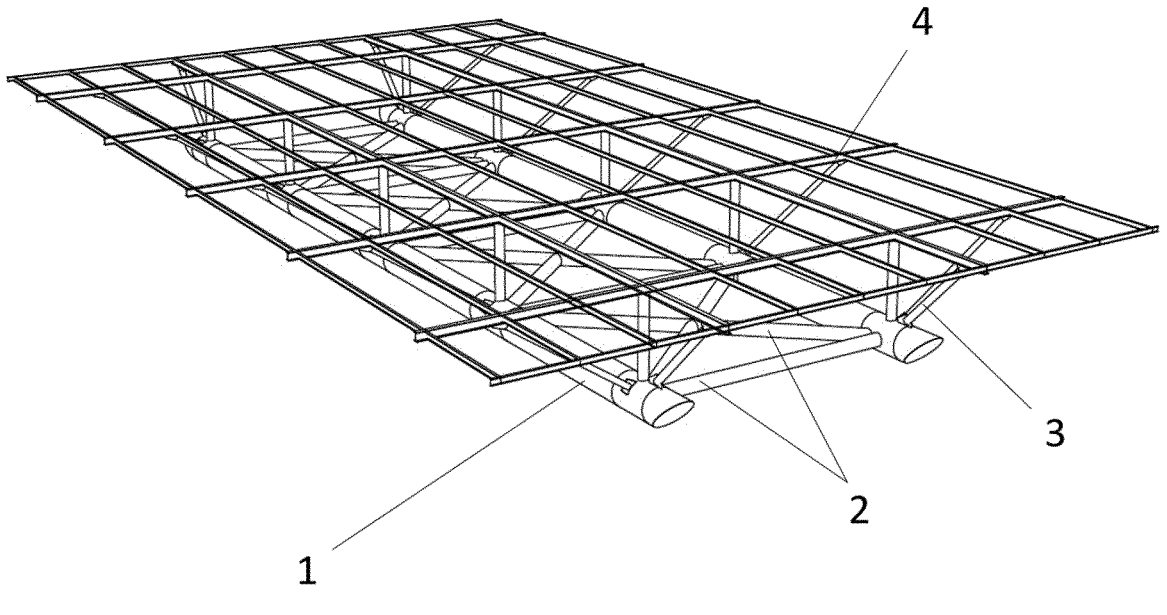
FIG. 1 shows a particular example of a floating device for the installation of offshore photovoltaic panels according to the invention in catamaran format.

FIG. 1 shows a particular example of floating device for the installation of offshore photovoltaic panels according to the invention in catamaran format.

Two main floating bodies 1 arranged in catamaran format can be seen in this figure, where these two main floating bodies 1 are in charge of displacing the water needed to provide stable and sufficient floating for the rest of the device.

These main floating bodies 1 are joined by means of several floating supports 2. These floating supports 2 are arranged in the plane defined by the main floating bodies, referred to as floating plane, by approximately reflecting the water level in calm conditions when the floating device is installed offshore.

These floating supports 2 joint the main floating bodies together both in the orthogonal direction with respect to same and in the diagonal direction, and have a length of 10 metres, which is the distance existing between two adjacent floating bodies. The diagonal supports have a longer length, since they join points of the main bodies that are more distant.

Once the framework of the base of the device (the main floating bodies 1 and the supports 2 joining them together) has been defined, a series of poles which project from the floating plane are also observed. Some of these poles 3 project in the perpendicular direction with respect to the floating plane, while others project forming 30 or 45° angles with said plane. These poles 3 thereby create a plurality of support points for placing a support cover 4, arranged in a plane parallel to the floating plane but 6 metres above it. It is thereby ensured that said support cover will be safe from the most common waves, allowing the device to be installed offshore.

The system formed by the main floating bodies 1, the floating supports 2, the poles 3, and the support cover 4 form a base joined in an integral manner. Better rigidity of the assembly is thereby achieved.

Furthermore, the main floating bodies 1 comprise several leak-tight compartments isolated from one another. A device that is more stable and resistant in the event of offshore adverse conditions is thereby achieved, because if one of the compartments is damaged and water enters said compartment, the remaining compartments are still leak-tight and, therefore, provide the device with the buoyancy needed to continue in operation.

Figure 2:
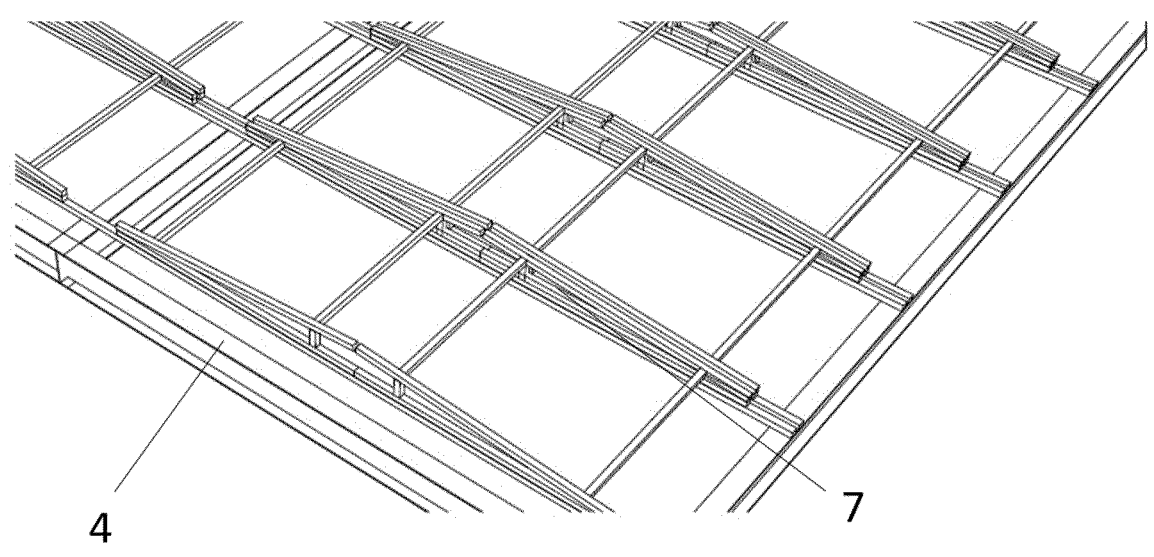
FIG. 2 shows a detail of the support cover of the floating device of FIG. 1.

FIG. 2 shows a detail of the support cover, where the detail of the structures 7 for receiving the solar panels can be observed, each of such structures being tilt-adjustable. The structure 4 thereby withstands all the mechanical loads coming from the stresses caused by the waves, while the structures 7 are not subject to these demands and can be designed with fewer mechanical requirements.

Figure 3:
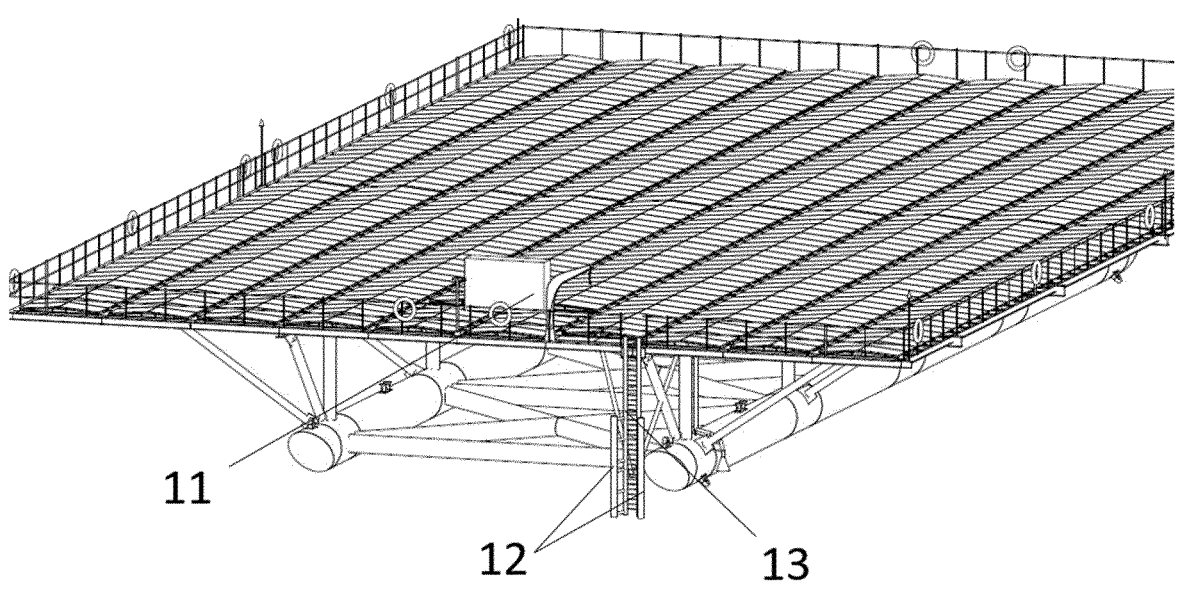
FIG. 3 shows a general view of a floating device with the photovoltaic panels assembled therein.

FIG. 3 shows a general view of a floating device with the photovoltaic panels assembled therein.

First, a transformer 11 located in the floating device can be seen. This transformer 11 allows a suitable output of the energy generated by the photovoltaic panels.

Second, an element suitable for receiving the berthing of ships by means of two impact structures 12 located for receiving the impact of a vessel upon berthing can be seen. Furthermore, the berthing element also has an access stairway 13 located on a plane other than the plane of the impact structures. People are thereby able to access the floating device.

Figure 4:
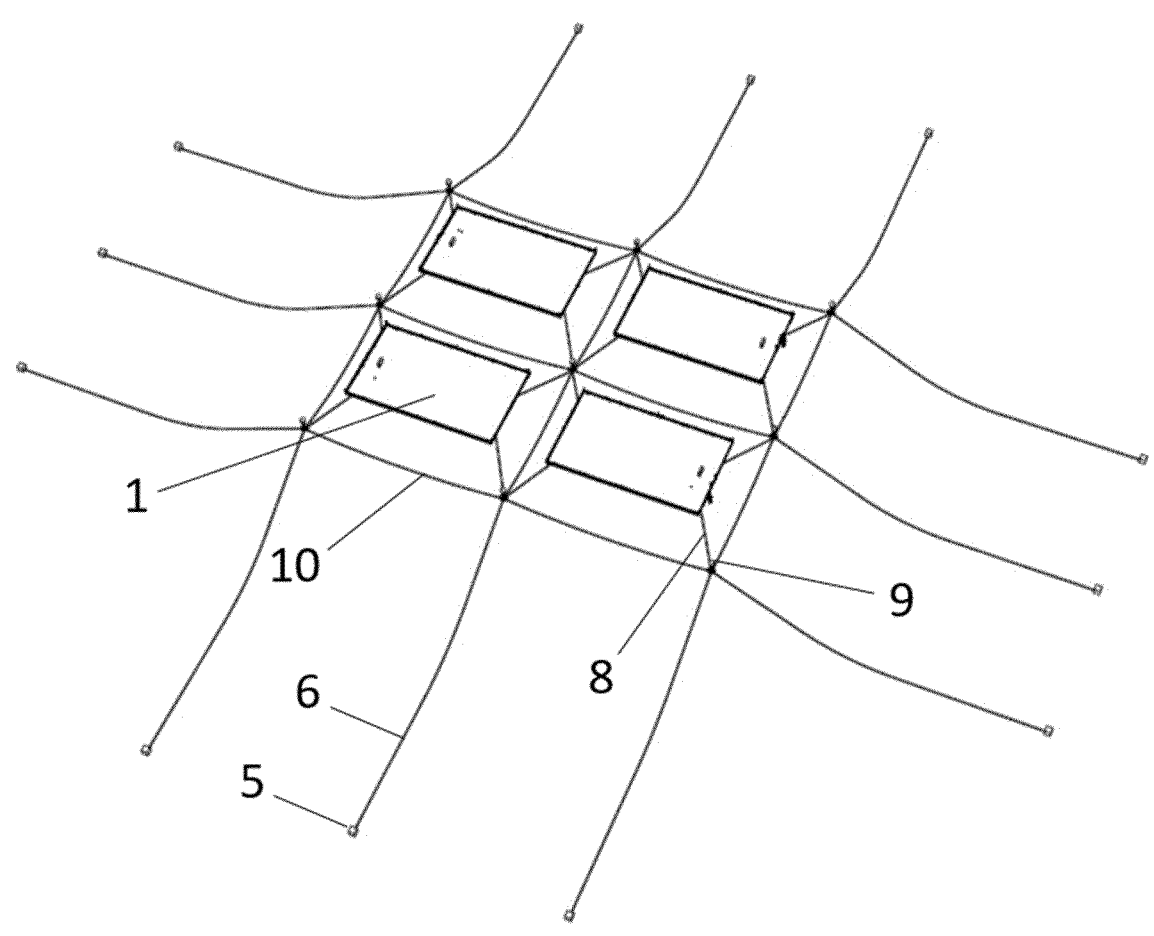
FIG. 4 shows a floating solar power plant, comprising six floating devices like the one described in FIG. 1.

FIG. 4 shows a floating solar power plant, comprising six floating devices like the one described in FIG. 3. A series of photovoltaic panels have been installed in each of these floating devices (7 columns with 20 panels in each column can be seen), with each panel being installed in one of the structures seen in FIG. 2.

Each of the main floating bodies 1 of the devices is joined by means of secondary cables 8 to a grid 10 of cables. This grid 10 of cables is held by means of a series of buoys 9 which are connected to each of the nodes of the grid. Stable buoyancy is thereby achieved for the entire assembly.

To get the system to remain in a stable position, there are a series of anchoring elements 5, such as an anchor or a concrete weight, and main mooring elements 6 joining the grid 10 of cables with the anchoring elements 5. The grid 10 of cables thereby remains in a stable position despite the back and forth movement of the waves.

This power plant is assembled by means of choosing a significant wave height. This wave height will depend on the particular conditions of the power plant installation site. Once this significant wave height is chosen, series of floating devices like those described in previous figures are provided, with the support cover thereof being located at a distance from the floating plane that is at least equal to the significant wave height. It is thereby ensured that the support cover remains at a sufficient height so that it is not constantly affected by the waves.

Once the height of the support cover is chosen, the main floating bodies of each of the floating devices are anchored to the installation point by means of the anchoring elements 5.

Lastly, a series of photovoltaic panels are installed in the support cover, with one panel being installed in each of the tilt-adjustable structures.

Figure 5:
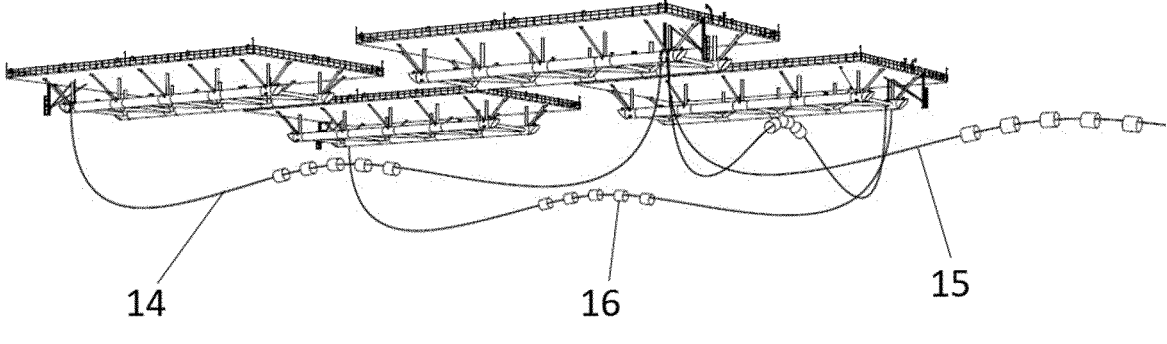
FIG. 5 shows an example of a floating element in one of the cables of the power plant of FIG. 4.

FIG. 5 shows a detail concerning the output of energy in the floating devices forming the power plant of FIG. 4. In this figure, it can be seen how each floating device comprises a current output 14, and the solar power plant comprises a general current output cable 15 which receives the current outputs from each floating device. In this figure, it can be seen how both the current outputs of each device and said general current output cable comprise a floating element 16, preventing the cables from being tensed due to the force of the sea currents.

The invention claimed is:

1. A floating device for the installation of offshore photovoltaic panels, the floating device being characterized in that it comprises:

a plurality of main floating bodies, arranged such that they define a floating plane, the main floating bodies being configured to displace at least 80 cubic metres of water in total; and the most distant of the plurality of main floating bodies being spaced from one another by at least a distance of 10 metres, wherein the main floating bodies comprise several leak-tight compartments isolated from one another;

a plurality of floating supports configured to join the plurality of main floating bodies together wherein each floating support of the plurality of floating supports joins one main floating body of the plurality of main floating bodies in one joining point;

a plurality of poles arranged along each of the main floating bodies, each pole having a first end that is joined to a main floating body of the plurality of main floating bodies and a second end opposite to the first end, wherein each of the poles measures at least 5 metres, wherein a first group of the poles are arranged perpendicular to the floating plane, wherein a second group of the poles are arranged forming an angle comprised between 5° and 60° with respect to the floating plane and wherein at least one of the poles of the first group of poles and at least one of the poles of the second group of poles share a point of origin in the floating plane;

a support cover joined to the second ends of the poles, wherein the support cover has a surface of at least 100 square metres;

at least one anchoring element; and a mooring structure configured to join the main floating bodies and/or the plurality of floating supports with the anchoring element.

2. The floating device according to claim 1, further comprising a ship berthing element, comprising at least two impact structures suitable for receiving the impact of a vessel upon berthing, the at least two impact structures forming an impact plane; and an access stairway located on a plane other than the impact plane.

3. The floating device according to claim 1, wherein the floating supports are contained in the floating plane defined by the main floating bodies and the joining points between each floating support and the main floating body are arranged equidistantly, such that each floating support is attached orthogonally or diagonally to said floating bodies.

4. The floating device according to claim 1, wherein the main floating bodies, the floating supports, the poles, and the support cover form a base joined in an integral manner.

5. The floating device according to claim 1, further comprising at least ten tilt-adjustable structures, all of them being joined to the support cover, and each of them being configured to receive a solar panel and to regulate the orientation thereof with respect to the support cover.

6. The floating device according to claim 1, further comprising a current inverter or transformer element, suitable for receiving energy and conveying it out of the floating device.

7. The floating device according to claim 1, wherein the mooring structure comprises a grid of synthetic fibre ropes or chains, in which each vertex of said grid is joined to a main floating body and/or to a floating support by means of a secondary mooring element, such that the grid of synthetic fibre ropes or chains is located in a plane other than the floating plane, wherein the secondary mooring elements are attached to the main floating bodies and/or the plurality of floating supports by galvanized shackles, stainless steel shackles, or swivel shackles.

8. The floating device according to claim 7, wherein at least two of the vertexes of the grid are joined to floating buoys.

9. The floating device according to claim 8, further comprising main mooring elements connecting the grid with the anchoring elements.

10. The floating device according to claim 1, wherein the anchoring element comprises an anchor or a dead weight.

11. The floating device according to claim 1, wherein the main floating bodies comprise at least one anchoring element suitable for receiving the main mooring element and/or for coupling a towline.

12. A floating solar power plant, comprising:

a plurality of floating devices according to claim 1;

a plurality of photovoltaic panels coupled to the support cover of each of the floating devices, each photovoltaic panel comprising a current output; and transverse joining elements configured to join at least two floating devices to one another.

13. The floating solar power plant according to claim 12, wherein each floating device comprises at least one current output and the solar power plant comprises a general current output cable which receives the current outputs from each floating device, wherein said general current output cable comprises a floating element.

14. The floating solar power plant according to claim 13, further comprising an inverter or transformer element having an input connected to the current outputs of each floating device and having an output connected to the general current output cable.

15. A method for installing a plurality of photovoltaic panels, which comprises performing the following steps:

considering a wave height;

providing one or more floating devices according to claim 1, wherein the distance between the floating plane and the support cover is at least equal to the wave height;

providing the plurality of photovoltaic panels;

anchoring the main floating bodies or the floating supports of the floating device(s) at an installation point located in the water by means of the anchoring elements; and arranging the plurality of photovoltaic panels on the support cover of the floating device(s).

* * * * *